Nov. 9, 1943.   P. H. HUME   2,333,864
EXTENSOMETER
Filed Jan. 15, 1942   4 Sheets-Sheet 1

Inventor:
PATRICK H. HUME,
by John E. Jackson
his Attorney.

Nov. 9, 1943. P. H. HUME 2,333,864
EXTENSOMETER
Filed Jan. 15, 1942  4 Sheets-Sheet 2

Inventor:
PATRICK H. HUME,
by John E. Jackson
his Attorney.

Nov. 9, 1943.    P. H. HUME    2,333,864
EXTENSOMETER
Filed Jan. 15, 1942    4 Sheets-Sheet 3
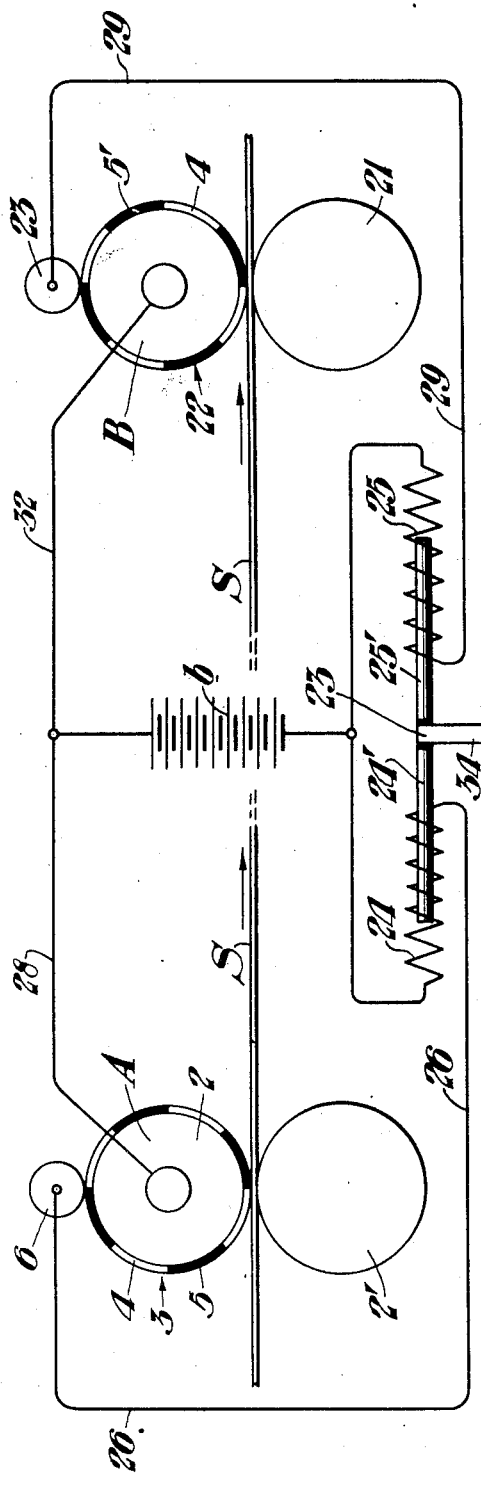
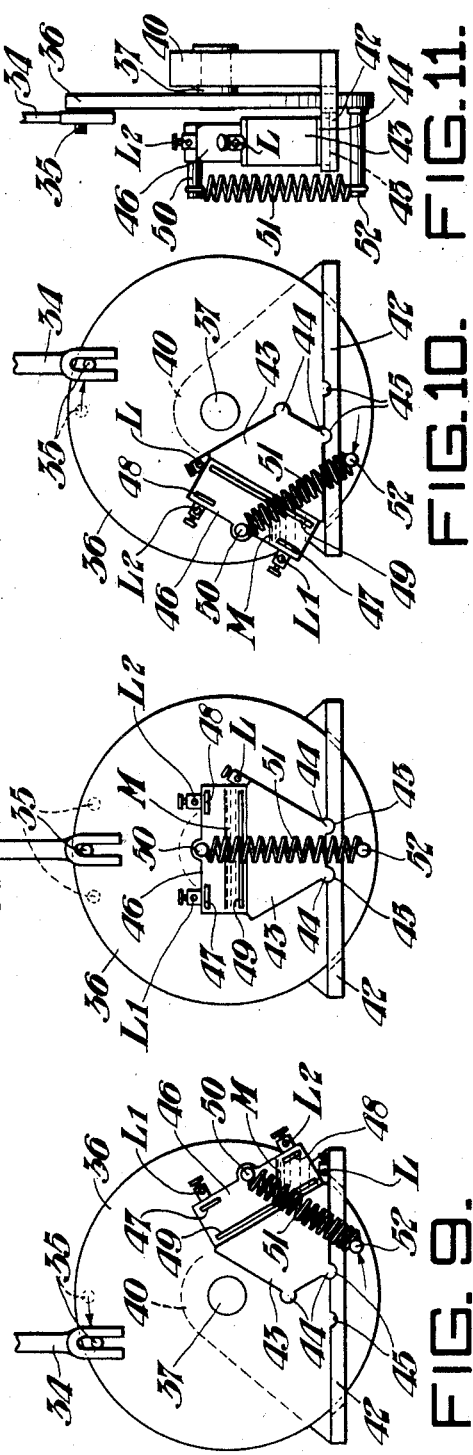
Inventor:
PATRICK H. HUME,
by John E. Jackson
his Attorney.

Nov. 9, 1943.  P. H. HUME  2,333,864
EXTENSOMETER
Filed Jan. 15, 1942  4 Sheets-Sheet 4
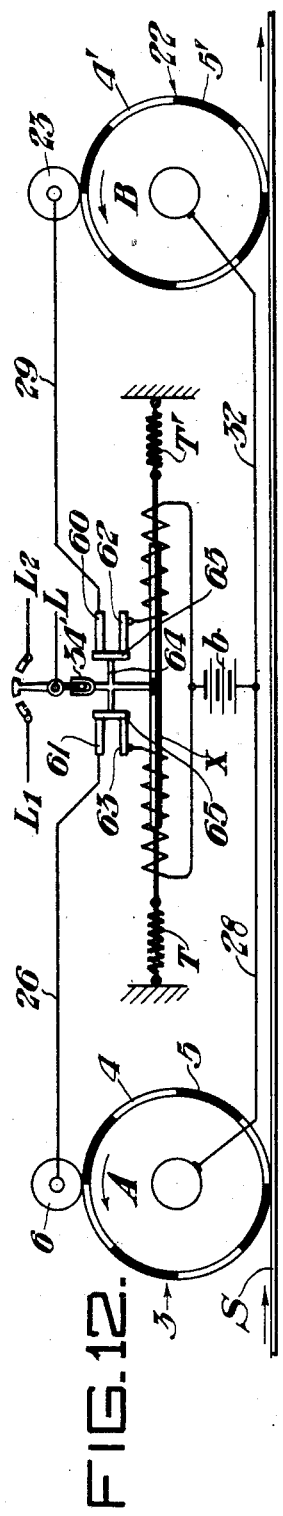
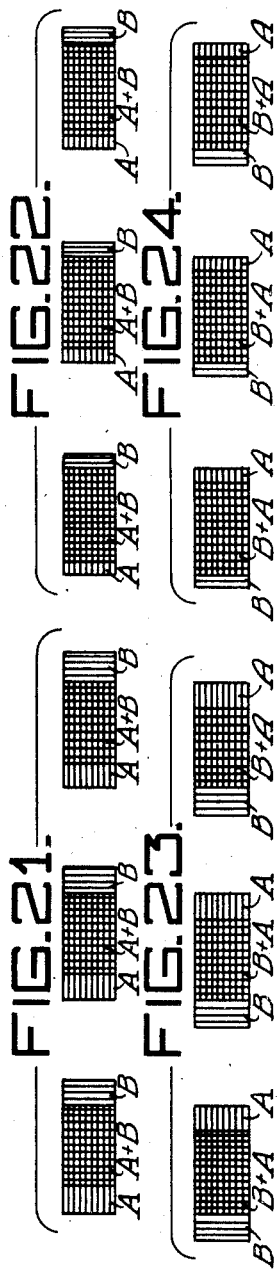
Inventor:
PATRICK H. HUME,
by: John E. Jackson
his Attorney.

Patented Nov. 9, 1943

2,333,864

UNITED STATES PATENT OFFICE 2,333,864

EXTENSOMETER

Patrick Henry Hume, Lakewood, Ohio, assignor to Carnegie-Illinois Steel Corporation, a corporation of New Jersey Application January 15, 1942, Serial No. 426,918

1 Claim. (Cl. 80—56)

This invention pertains to the measurement of the amount of extension imparted to an elongated metal body during the reduction thereof, as by rolls or dies. It is applicable to the measurement of wire and strip during the reducing operation and is applicable to the automatic control of the reducing forces so as to produce metal stock of uniform gauge. In these respects it is a companion application to that filed October 1, 1941, Serial No. 413,224, in the names of Allen E. Hibschman et al., entitled "Extensometers," and identified as companion case "A."

The present invention (which may be applied to the automatic control of rolling mills and tension devices through the instrumentalities disclosed for that purpose in case "A") differs from that invention in providing for the execution of these functions without the necessity of placing a physical marking upon the workpiece as a condition precedent.

In the accompanying drawings, Figure 1 is a schematic side elevational view of a rolling mill and measuring instrumentality, including a wiring diagram illustrative of one embodiment of the present invention.

Figure 8 is a simplified diagrammatic view illustrating the essentials of the invention, showing the associated switch in neutral position.

Figures 9 and 10 show the delayed action snap switch, illustrated in Figure 8, in its various operating positions.

Figure 11 is a side elevational view of the switch shown in Figure 8, viewed from the right-hand side of the latter.

Figure 12 is a diagrammatic view of a modified form of the invention.

Figures 13 to 17 are a series of fragmentary side elevational views showing the progression of the contactor and commutator element in different positions of the commutation cycle.

Figures 18 to 24 schematically represent planar projections of the commutation cycles and their relation to each other.

Figure 1:
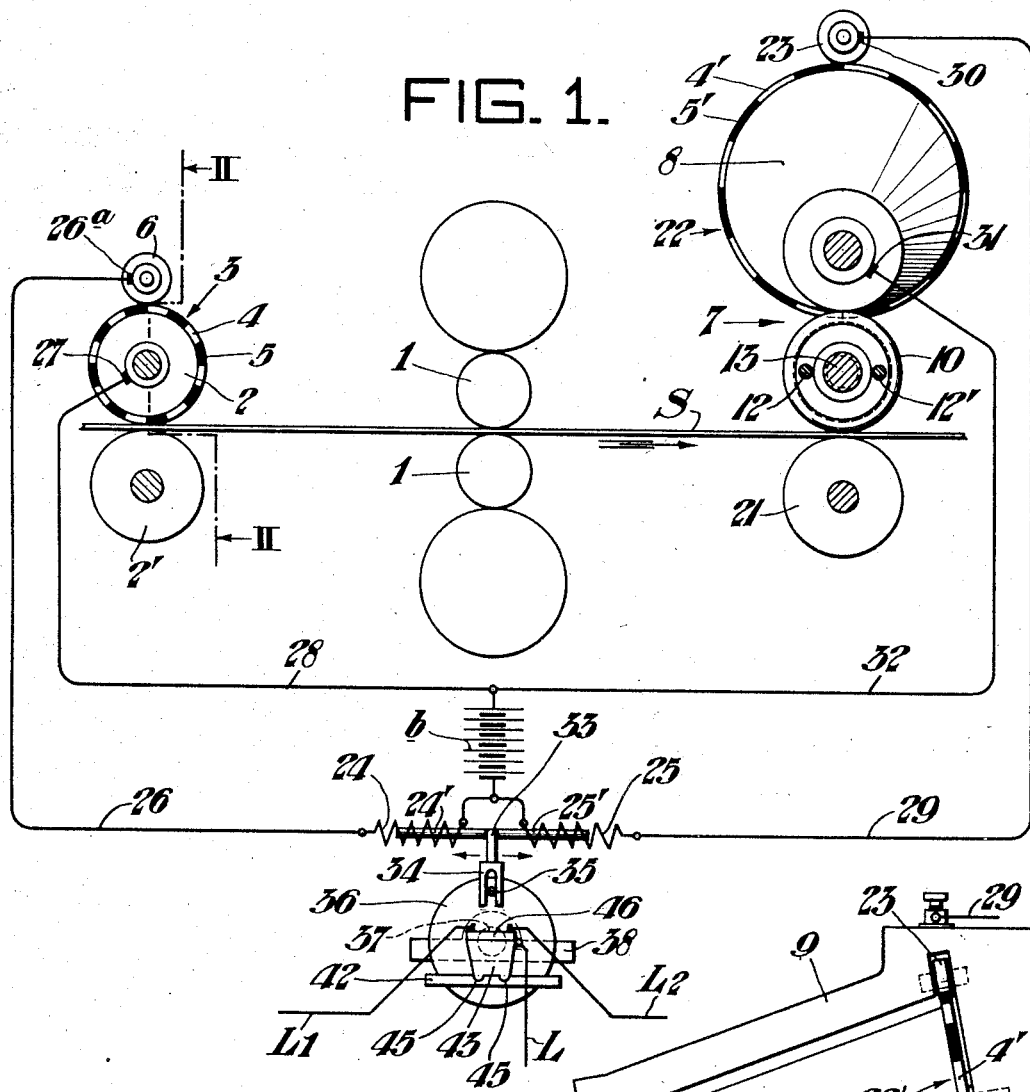

Referring now more particularly to the drawings, in which like reference characters refer to like parts throughout, the strip S is advanced through work rolls 1 so as to be reduced in thickness to a lighter gauge, the movement of the strip being in the direction of the arrow (as shown in Figure 1). The lineal velocity of the strip as it leaves the work rolls is greater than its entering velocity by virtue of the reduction in cross sectional area and resultant extension imparted thereto.

Figure 2:
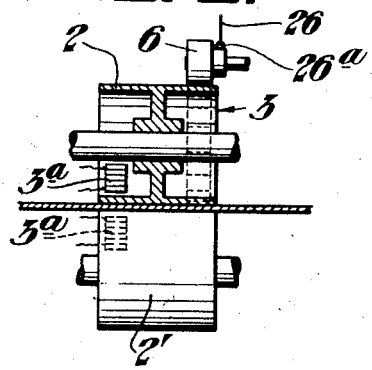
Figure 2 is a cross sectional elevation of one of the devices shown in Figure 1, taken along line II—II in that figure.

The present invention uses such differences in velocity to determine the amount of extension resulting from the reducing operation. This is accomplished by disposing upon the entry side of the mill, so as to be driven by the movement of the strip, a pair of pinch rolls 2 and 2', which grip the strip to eliminate slippage therebetween. This function may be assisted by electromagnets 3a applied, as shown in Figure 2, so as to exert a mutual attraction for each other, for the pinch rolls, and for the strip passing therebetween, to insure against slippage.

Associated with one of the pinch rolls 2 and 2' is a commutator 3 having conductive portions 4 and insulative portions 5, in contact with which a take-off roller 6 is adapted to run.

At the exit side of the mill there is arranged, in rolling engagement with the strip so as to be free from slippage, as in the case of the pinch rolls 2 and 2', a differential drive arrangement 7 (see Figures 1, 3 and 4), which comprises a cone-shaped drum 8 journaled for rotation in a frame 9 in spaced relation from the strip, so that the generating line of its surface nearest to the strip falls parallel to the latter.

The motion of the strip is applied to drive the cone-drum 8 by an idle wheel 10, which is adapted to revolve about a stationary hub 11, which hub is supported against rotation by slide rods 12 and 12' extending parallel to the strip between opposite portions of the housing 9 just below the point therein where the cone-drum 8 is journaled.

The hub 11 of the idle wheel 10 is provided with a central bore threaded to receive a propelling screw 13, which is journaled at each of its ends to the frame 9 between the slide rods 12 and 12'. At its inner end (see Figure 4) the screw is adapted to be driven through suitable bevel gearing 14 and shafting 15 in such manner that revolutionary movement of the shaft 15 causes the screw 13 to turn to vary the axial position of the idle wheel 10 between the cone 8 and the strip S.

Figure 4:
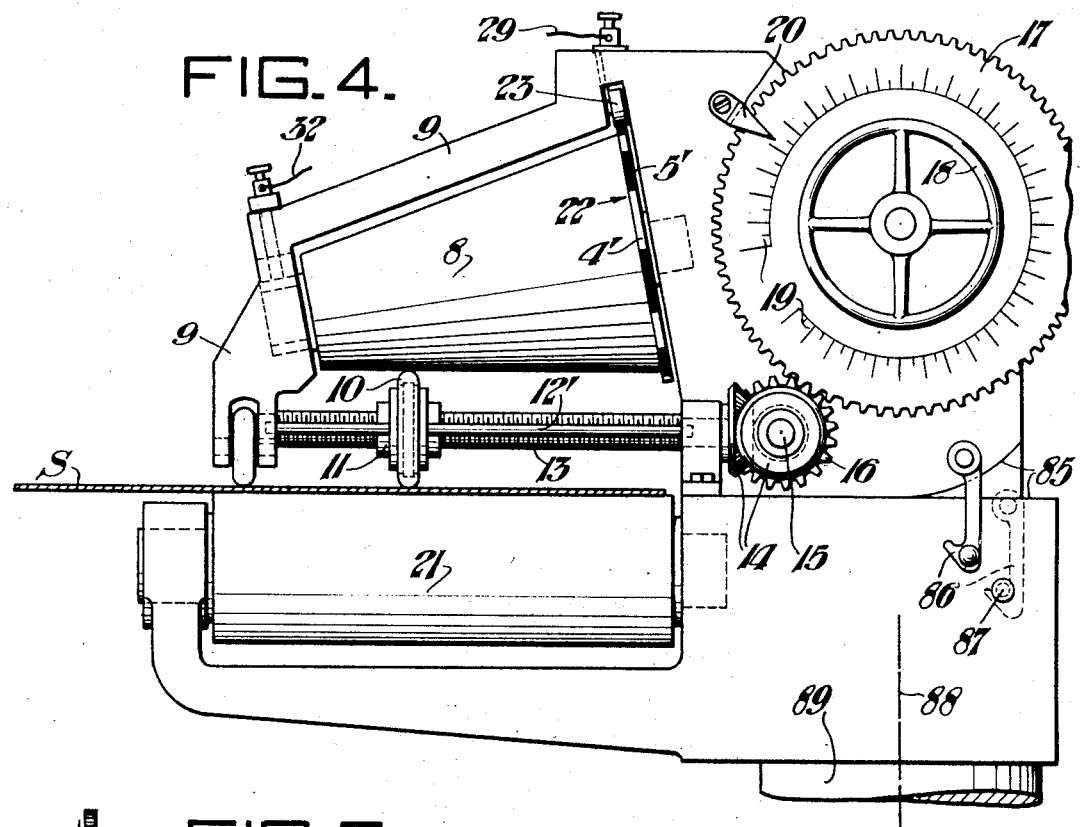
Figure 4 is a front elevational view of the device shown in Figure 3, and corresponding to the latter, showing some of the parts in greater detail.

Still referring to Figure 4, it will be seen that the shaft 15 is provided at its outer end with a pinion 16, which is in driving engagement with a spur wheel 17, the turning of which latter is facilitated by a hand-wheel 18 connected therewith. A suitable scale 19 is fixed to the spur wheel 17 so that its angular placement may be read in reference to a stationary point 20 carried by the housing 9. The angular movement of the spur wheel 17 is thus related to the axial placement of the idle wheel 10, in relation to the cone-drum 8 and the strip S. The scale 19 on the spur wheel 17 is, accordingly, calibrated so as to read in units of strip elongation, determined by the placement of the idle wheel 10 in reference to the cone-drum, as will be described hereinafter.

Figure 3:
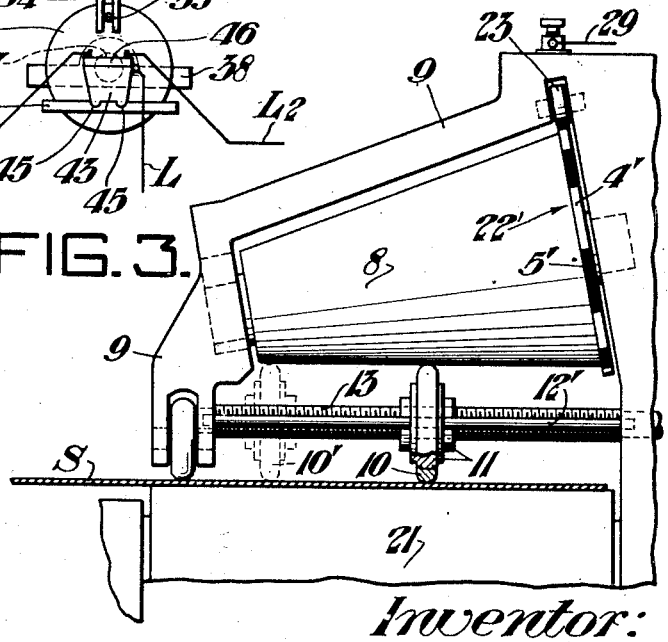
Figure 3 is a fragmentary view of another of the devices illustrated in Figure 1, as viewed from the right-hand side of the latter.

In order that the motion of the strip may be imparted to the cone-drum 8 through the idle wheel 10 without slippage, subjacent support is afforded the strip, so as to back up the wheel 10, by a revoluble cylinder 21, which extends crosswise of the strip S for a sufficient ditsance completely to underlie the axial traverse of the idle wheel 10, as shown in Figures 3 and 4.

Associated with the cone-drum 8, so as to be driven thereby, is a commutator 22, which is comprised of conductive and insulative segments 4' and 5', respectively, which correspond in number and angular extent to the commutating segments 4 and 5 of the commutator carried by the pinch roll 2. A take-off roller 23 is permanently supported in rolling engagement with the commutator 22 so as to engage the segments thereof as the cone-drum 8 is revolved.

By reference to Figure 1, it will be seen that two commutators are connected with solenoid windings 24 and 25, respectively, in bridge relation with a battery b. Current from the battery b, during the interval of revolution when the conductive segments of the commutator 3 are beneath the take-off roller 6, goes to energize the coil 24 through line 26 to a brush contact 26a in electrical engagement with the roller 6. The current passes through the latter to the conductive segments 4, through the web of the pinch roll 2, to a brush contact 27, disposed in electrical engagement against the hub of the pinch roll 2, and, thence, through line 28 back to the battery b.

When the roller contact 23 at the right-hand side of Figure 1 is in engagement with one of the conductive segments 4' of the commutator 22, current passes from the battery b through the solenoid winding 25 to line 29, which is secured to a brush 30 in electrical engagement with the roller 23. The current is transmitted through the cone-drum 8 to one of its hubs, at which point a brush 31, in electrical engagement therewith, returns the current through line 32 to the battery b.

From the foregoing arrangement, it will be seen that, if the roller contacts 6 and 23 are predisposed in relation to their respective commutators 3 and 22 so as to make and break the bridge circuits simultaneously upon the revolution of the commutators at the same speed, then, the battery b will energize the coils 24 and 25 simultaneously, and, in continuing such synchronous commutation, the coils will likewise be de-energized in unison. If, however, the commutation should not be effected simultaneously, first one coil, and then the other, would be energized and de-energized in staggered relation, causing a response now to be described.

The coils 24 and 25 are provided, respectively, with armatures 24' and 25', which are secured together into a unitary assembly as at 33. As the coils are energized and de-energized simultaneously, the forces upon the armature assembly are exerted equally and oppositely, by virtue of the windings of the two solenoids, so that the armature assembly is retained in equilibrium midway between the two coils. If, however, one of the coils is energized first, the armature will move into that coil so as to minimize the reluctance of the associated magnetic circuit, and will remain there, even though the opposite coil is energized momentarily thereafter. The magnetic attraction exerted upon the armature of the first coil to be energized is the stronger, since it moves into position completely to satisfy the magnetic force of that solenoid, and, in so doing, is withdrawn from the opposite solenoid, which must, therefore, exert a lesser force and weaker pull upon the armature. This condition prevails until the first solenoid is de-energized, which leaves the opposite solenoid still exerting a magnetic pull upon the armature assembly, and, thus, causes the latter to return in a direction opposite to its first movement.

Any suitable drive linkage may be applied to the armature assembly so that the motion thereof, in response to the commutation of the current from the battery b, may be applied to actuate a switch mechanism, or relay device, effective to actuate a signal, or means operative to control the reducing condition.

In Figure 1, one suitable arrangement has been illustrated. A fork 34 is rigidly affixed to the armature assembly so as to be in driving relation with the pin 35, fixed adjacent to the periphery of a wheel or disc 36. The wheel or disc is journaled for oscillatory motion about an axis 37, upon a suitable stationary mounting 38. A delayed action snap switch (shown in greater detail in Figures 8, 9 and 10), is associated with the oscillatory wheel 36 so as to close a power line L with either of the contacts L₁ or L₂, depending upon the movement of the armature assembly, all as will be more fully described hereinafter.

From the foregoing description, it will be seen that the measuring function is effected by the establishment of synchronous conditions between the commutator 3, as it is driven by the strip at the speed at which it enters the mill, and the commutator 22, as it is driven through the idle wheel 10 and the cone-drum 8 at the speed at which the strip exits from the mill. If it be assumed that the idle wheel 10 is of a diameter equal to the effective diameter of the pinch roll 2, and that the cone-drum 8, adjacent its small end, is of the same diameter as the idle wheel 10 and pinch roll 2, then, with the work rolls 1 opened so as to effect no reduction in the strip passing therethrough, and the idle roll 10 set in position 10' (shown in dotted lines, Figure 3), the rates of commutation at 3 and 22 will be equal.

If it be assumed that the work rolls 1 are set to impart a reduction in cross sectional area to the strip S, with a consequent extension in length thereof, the idle wheel 10 will be driven by the strip at a greater speed than the pinch roll 2, requiring, for the preservation of synchronous conditions, that the idle wheel 10 be propelled along its slide rods 12 and 12' to some point intermediate the ends of the cone-drum at which it is in engagement with a larger effective diameter thereof. The new setting should be such that the accelerated speed of the strip is reduced, in terms of the rate of revolution of the commutator 22, to equal the entering strip speed, in terms of rate of revolution of the commutator 3. If such reduction is equal to the amount of extension imparted to the strip, the commutation rate at the two commutators will be maintained equal. It is, therefore, only necessary to interpret the position of the idle wheel 10 along the slide rods 12 and 12' into amounts of elongation imparted to the strip. Since the position of the idle wheel is varied by revolving the screw 13, any suitable instrumentality involved in the drive of the latter, such as the spur wheel 17, may be provided with indexing 19 indicative of the amount of extension being imparted to the strip, as illustrated in Figure 4.

If the diameter of the large end of the cone-drum 8 is twice the diameter of the small end, such will allow for the measurement of as much as 100% extension when the idle wheel 10 is disposed beneath the largest effective diameter of the cone-drum.

It is intended that the reducing medium, such as a rolling mill or drawing die, shall be preset so as to subject a work-piece to those amounts of compressive and/or tensile forces believed to be provident of the desired gauge after reduction. Then, in applying the measuring and/or control functions of the present invention, the device shown in Figure 4 should be adjusted by turning the hand-wheel 18 until the desired gauge thickness, and/or amount of extension to be imparted to the strip, is indicated on scale 19 with reference to a fixed point 20. The angular movement required to bring the spur wheel 17 to the proper setting, will, through the pinion 16, shaft 15, and associated bevel gearing 14, turn the screw 13 so as to predispose the idle wheel 10 at that effective diameter on the cone-drum 8, which will drive the latter, and its associated commutator 22, at a speed equal to that of the commutator 3, in response to the movement of the strip.

Pinch rolls 2, and the idle wheel 10, together with its associated cone-drum 8, are brought into engagement with the strip and the reducing operation is commenced. If accurate gauge conditions are in effect, the speed of the strip after it leaves the work rolls will drive the idle wheel 10 at a greater speed than the pinch roll 2 is driven, which rate of speed, when translated through the larger effective diameter of the cone-drum, will drive the commutator 22 to make and break the circuit of the battery b at the same rate at which the current of the battery b is commutated at the entering side of the mill. If both commutators are started at the same relative position as to the conductive and insulative segments of their respective cycles, then the ensuing energization and de-energization of the bridge circuits of the battery b should be accomplished simultaneously. This maintains the armature assembly of the coils 24 and 25 in neutral position.

Let it be assumed, however, that the conditions of reduction are not sufficient to produce a strip of the gauge desired, the idle wheel 10 is not revolved as rapidly as expected, and, hence, does not revolve the cone-drum 8 at sufficient speed to maintain the commutation rate of the associated commutator 22 equal to that of the commutator 3. This will cause the make-and-break cycle of the commutator 3 to precede that of the commutator 22 by an amount directly proportional to the error in gauge setting. This will cause the circuit of coil 24 to be energized ahead of the circuit of the coil 25 each cycle, causing the armature 24' to be drawn leftwardly (as viewed in Figure 1) so as to throw the snap switch into the position shown in Figure 9, closing the circuit between the leads L and L2, so as to actuate a signal device, or to set into motion an automatic means for correcting the gauge setting, as is shown and described in companion application A, mentioned above.

If it be assumed that the conditions of reduction are provident of too much extension from that anticipated by the setting of the idle wheel and cone-drum previously described, the commutator 22 will be revolved at a greater rate than the commutator 3, effecting the closing of the circuit of coil 25 to move the armature 25' rightwardly (as viewed in Figure 1), so as to cause the associated switch device to be actuated to the position of Figure 10 to close the circuit between leads L and L1. This will be effective in actuating a different signal means, indicating the excessive reduction, so that the reducing condition can be manually corrected, or can be instrumental in setting up automatic correction, as explained in the previously mentioned case A.

A simplified disclosure of the commutators, and their relation to the bridge circuit, is shown in Figure 8, which is also drafted to show the associated snap switch, mentioned in connection with Figure 1, in greater detail. In the interests of simplicity, the work rolls, which are shown greatly out of proportion in Figure 1, have been omitted, together with the idle wheel 10 and cone-drum 8.

It will be understood by reference to Figure 8 that the armature assembly 24' and 25' is usually under such conditions of recurrent magnetism so as to be maintained in neutral position midway between the coils 24 and 25, when the work-piece undergoing reduction is being produced to the proper gauge. It is supposed that the commutators 3 and 22 will be set in relation to their respective contactors 6 and 23 at the commencement of any measuring operation to be in phase with each other with respect to the positioning of the conductive and insulative portions to their respective contactors. To facilitate arriving at such starting condition, a suitable zero datum mark (not shown) may be included on each of the commutators in reference to some fixed datum mark (not shown) placed adjacent thereto, which latter may well be associated with the contactors 6 and 23.

When the strip is set in motion after the necessary adjustments, previously explained, have been made, the commutators will function synchronously to maintain the armature assembly in a substantially neutral position (as shown in Figure 8). Any slight asynchronism, creeping in by virtue of mechanical imperfections, will cause the armature to vibrate somewhat, but such vibrations will be compensated for by the character of the snap switch controlled thereby, as will be presently described. It is necessary, therefore, for there to be an actual departure from gauge before the armature will be caused to move sufficiently far in either direction to cause the switch to trip. One form of switch for carrying out this function is disclosed in Figures 9 to 11, inclusive, which will now be described.

As previously mentioned, the armature assembly is provided with a fork 34 by which the reciprocatory motion of the armature, under conditions of asynchronous commutation, can be translated into revolutionary oscillations of a wheel or disc 36, pivoted as at 37, to any suitable stationary support 40. Below the center of the disc 36, and to each side thereof, are rigid extensions which project outwardly from the support 40 beyond the plane of the disc so as to be connected by a stationary bridge piece 42 that forms a platform in front of, and out of contact with, the disc. An angular rocking member or stool 43 of solid construction is mounted centrally of platform 42, and is provided at its lower corners with cylindrical bearing protuberances 44 for engagement with bearing recesses 45 disposed in the platform. The top surface of the stool 43 is provided with a mercury switch 46, at one extremity of the top inner surface of which is disposed contact 47 to which the lead $L_1$ is connected, and, at the other top inner extremity of which, is disposed the contact 48, which is electrically connected with lead $L_2$. The bottom inner electrode 49 extends across the switch casing to which the lead L is electrically connected. This relationship is such that when the stool 43 is dumped to the right (as shown in Figure 9), a pool of mercury M, carried inside the switch, closes the circuit of contacts 48 and 49, or, if dumped to the left (as is shown in Figure 10), closes circuit between contacts 47 and 49. When in neutral position (as is shown in Figure 8), both the circuits of $L_1$—L and $L_2$—L are open.

Centrally of the mercury switch casing 46 is a trunnion bearing or pin 50 to which is connected a tension spring 51. The spring, at its lower end, is connected to a pin 52 secured to the disc 36 so as to move therewith, upon the opposite side of the center thereof, 180° from the fork-pin 35.

As the fork reciprocates the disc, the pin 35 is oscillated between extreme positions (shown in broken lines, Figure 8) and the pin 52 is moved a corresponding distance in the opposite direction below the center of the disc 36. If the axis of the spring 51, in extending from the pin 50 is, by virtue of the placement of the pin 52, drawn beyond one of the bearings 44, 45, of the stool 43, the latter is caused to dump over to the side nearest the position of the pin 52. By studying Figure 8, it will be seen that considerable angular motion of the disc 36 is possible before the stool 43 is upset to either of the positions of Figure 9, or Figure 10.

Once disposed in the upset position, a corresponding annular movement is allowable before the stool is returned to neutral. By this means, any wild oscillations described by the disc 36, in response to the mechanical imperfections in the commutation of the current, or tolerable gauge departures, will be compensated for, requiring that such asynchronism occur in the rate of commutation, as accompanies substantial departure from gauge, before the switch is actuated, as described.

For the sake of explaining the phase relationships of the commutators 3 and 22, the planar projections of Figures 18 to 24, inclusive, have been provided for consideration and discussion in conjunction with Figures 13 to 17. For the sake of convenience of description, the commutator 3 at the left-hand side of Figure 8 has been designated "A" while that of the right-hand side 22 has been designated "B." Figure 18 is representative of the recurrent cycle of commutation of the commutator A, the portions provided with the horizontal hatch being those intervals when the current is on, while the intervening spaces represent open circuit. In Figure 19 a corresponding representation has been made of the commutation cycle of the commutator B of Figure 8, but in this case the closed-circuit periods of the cycle are represented by a vertical hatch. Figure 20 is representative of the commutation effected at A and B simultaneously, thus giving a composite cross hatch. It will be appreciated that the long dimension of the page containing these figures, is representative of elapsed time from left to right, which would make the time factor thus correspond to the abscissae of a graph.

The condition represented in Figures 21 and 22 shows the commutating cycle of A and B when the work-piece is being elongated insufficiently, causing the commutator B to lag behind the commutator A as previously described. It will be observed that A is first to close circuit as indicated in Figure 21, which would cause the armature 24' of the coil 24 to move leftwardly as viewed in Figure 8, thus to cause the switch 46 to snap rightwardly as shown in Figure 9. This connects the power lead L with the circuit of contact $L_2$ and causes a signal to register this condition, or sets about a correction of the conditions of compression and/or tension to impart a greater amount of elongation to the work-piece. Such automatic correcting means is disclosed in case A, as already mentioned.

In response to the correction thus instituted, the commutation rates approach synchronism, as is evidenced by the nearly congruent relationships shown in the planar projection of the commutation periods in Figure 22, in which the interval of A alone is smaller than that in Figure 21. In each case, however, inasmuch as A is sufficient to trip the switch by moving the armature from mid-position, the residual factor B in these figures is inadequate to do more than cause the armature to return to mid-position, with the switch correspondingly actuated. If the time interval is insufficient for the coil, actuated by the commutator B, to pull the armature the distance necessary to trip the switch, by way of return movement, it stays predisposed, as in Figure 9, causing the automatic correction operation to proceed without interruption. Inasmuch as the period during which B alone is effective becomes less and less as the correction proceeds, there will be less and less tendency for the switch to return to neutral position in response to the armature's movements. This condition will prevail until the strip has been elongated sufficiently to put B slightly ahead of A, as is shown in Figure 24. In this instance, since B is the first to close the circuit, the coil 25 is energized before the coil 24, and the armature is drawn rightwardly, as viewed in Figure 28, to cause the switch to assume the neutral position, thus to discontinue the correcting operation.

If it is assumed that, from a synchronous start, the work commences to elongate too much, the commutator B of Figure 8 will close circuit from any open circuit position before the commutator A closes circuit, giving rise to the condition shown in Figure 23. In each instance the commutator last to close circuit remains on for an interval (represented by A in Figure 23) after the other commutator has passed to open position. In great maladjustments, this may be sufficient to cause the armature to move in the opposite direction, past neutral position, a sufficient distance to restore the switch to neutral and open all circuits. The switch would, however, again be thrown to the position of Figure 10 upon the next phase of the commutating cycle shown in Figure 23, when the B circuit is momentarily energized ahead of the A circuit. In this manner the correction is narrowed down to the point where the remaining A value, such as is represented in Figure 24, is insufficient to cause the switch to return to neutral position, requiring that the correction proceed until the commutation rate at A is slightly in excess of that at B, causing neutrality to be resumed.

For all ordinary intents and purposes, the slight lead or lag A may have over B during the restitution of gauge, or vice versa, would be within allowable gauge tolerance, and would be tolerated by the mechanism without causing the switch to throw one way or the other.

If it be assumed that A and B are both commenced at the same points in the commutating cycle, and the mill is set as nearly as possible to provide the proper gauge, such variations in the amount of reduction imparted to the work-piece as do occur will provide an asynchronous commutating condition in which either the commutator A or the commutator B leads but slightly in advance of the other, even though the gauge error be great. The reason for such a slight variation in response is easily explainable. If, by reference to Figure 13, it is considered that both commutators A and B are set to commence operations as shown in that figure, there would have to be a deviation from the desired conditions of nearly 50% error in the setting of the mill for the anticipated reduction, before one of the commutators could obtain the position shown in Figure 14, while the other, at that instant, was as pictured in Figure 13, in one commutational cycle. Similarly, if one of the commutators were as shown in Figure 13, with the other as shown in Figure 15, there would have been, for the interval of time required for the two to have attained such differential, an error in mill setting equivalent to 100% over or under the intended gauge. Such large errors as these are inconceivable in view of the fact that the present day means provided to set rolling mills are capable of presetting for the predetermined gauge with an error of only a few percent.

The device of the present invention looks toward the correction and maintenance of proper gauge condition, where the error does not greatly exceed the few percent resulting from conventional mill practices applied in the attempted accurate presetting of a mill. Thus, as soon as any departure from gauge becomes manifest in the extension of the work-piece, the commutation rates vary, causing the armature to move rightwardly or leftwardly as shown in Figure 8, so as to restore the proper gauge conditions before substantial amounts of stock have been produced. It will be understood that during the intervals when both commutators are in closed circuit position (as is shown in Figure 21), the one first to come on will prevail throughout the composite, as is represented by A and B in Figure 21, due to the predisposition of the armature by that interval when A alone is on. Thus, in Figure 21, when the A commutator is as shown in Figure 14, the B commutator is as shown in Figure 13, and as the A commutator approaches the open circuit position shown in Figure 15, B is in position corresponding to Figure 14. As the correction proceeds, A closes circuit, and is in the position shown in Figure 17, by the time B obtains the position in Figure 13, which is represented in the planar projection of Figure 22. The intervals between when the current is on is shown when A or B (depending upon which is the last), traverses the non-conductive portion, as shown in Figure 16, while the other is about to close circuit, as shown in Figure 13. In Figures 21 and 22, this interval is represented by the space between the right-hand portion of the B interval and the left-hand portion of the A interval, respectively. In Figures 23 and 24, it is the reverse.

In Figure 12, there has been shown a modified form of control device in which the commutators A and B, through the bridge circuits with the battery b, energize the solenoids 24 and 25, respectively, as previously described, so as to throw the armatures X rightwardly or leftwardly against the tension of springs T and T'. The contactor 23, in engagement with the commutator B, is connected to a slide contact 60, while the lead of the contactor 6 of the commutator A is connected with the slide contactor 61. Spaced from the contacts 60 and 61 are companion slide contacts 62 and 63, respectively, to which the lead ends of the solenoids 24 and 25 are connected.

The armature fork 34' carries an insulative cross bar 64, at the opposite ends of which are contact bridging elements 65. The relationship is such that when the armatures X move to the left (as viewed in Figure 12), the contacts 61 and 63 are retained in closed circuit relation by the associated bridge contactor 65, while the slide contacts 60 and 62 are opened by virtue of the withdrawal of the associated bridge contact 65 from engagement therewith. If the armature moved rightwardly (as view in Figure 12), the reverse would be true.

This arrangement is to provide for the elimination of the effect of that half of the bridge circuit last to be energized. Thus, let it be assumed that, by virtue of insufficient extension, the commutator A closes circuit before the commutator B closes circuit, whereupon armature X is drawn leftwardly in Figure 12, tensioning spring T', and slacking off on spring T. The bridge circuit A is maintained closed by the bridge contact 65, while the bridge circuit B is opened by the now leftward disposition of the armature. After the closed-circuit portion of the A commutating cycle is ended, the B commutator continues in closed-circuit relation for a brief interval, which ordinarily would energize coil 25 to return the armature. But since the B circuit is open across the contacts 60 and 62, the coil 25 remains de-energized, and no return force is applied to the armature except that of the spring T'. The residual magnetism of the coil 24 and the inertia of the parts will still be resisting the spring T' in its efforts to return the armature assembly to neutral position during the remaining period in which B only would be effective if its circuit were closed. As the interval between the commutation periods prevails, when both A and B circuits are open, the spring T' will restore the armature to neutral position. If the departure from gauge had been in the opposite direction (as shown in Figures 23 and 24) the reverse operation would be true.

Incident to the vibration of the armature, the switch carrying lead L is closed with either contacts L₁ or L₂ to operate distinctive signals, or automatic correcting mechanism, mentioned in conjunction with the other figures. From the foregoing, it will be seen that as the departure is such as to effect commutation at A in advance of the commutation at B, the vibration of the armature will be back and forth leftwardly of the neutral axis, while in the case of the commutation of B being in advance of that at A, the vibration of the armature would be back and forth rightwardly of the neutral axis. In each case the springs T and T', in hunting equilibrium, tend to return the armature and associated switch to neutral position. Thus, is the effect of that side of the bridge circuit which would be energized last prevented from counteracting the correction in gauge.

Figure 5:
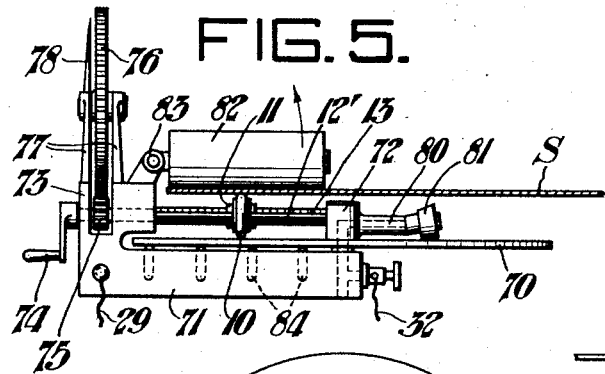
Figure 5 is a side elevational view of a modified form of the invention.
Figure 7:
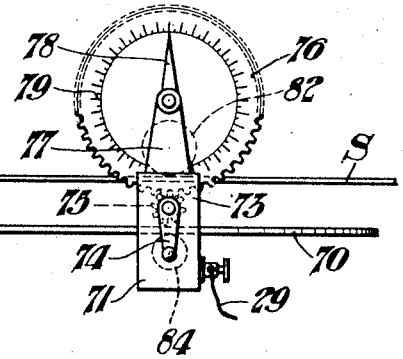
Figure 7 is a front elevational view of the device shown in Figures 5 and 6.
Figure 6:
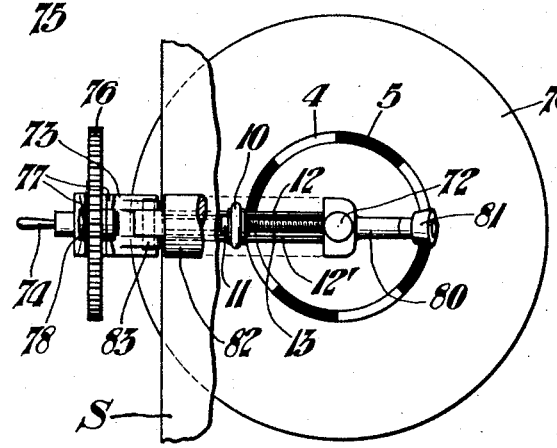
Figure 6 is a plan view of the device shown in Figure 5.

The apparatus disclosed in Figures 5, 6 and 7 constitutes a modified form of differential mechanism, which can be used in place of the cone-drum type shown in Figures 1, 3 and 4. In this instance, however, the motion of the strip S is imparted through the idle wheel 10 to a disc 70, which is adapted for rotation upon a vertical axis supported by a stationary mounting 71.

Centrally of the disc, and stationarily fixed at the upper extremity of the pivotal bearing thereof, is a hub member 72 between which, and an upwardly extending portion 73 of the support 71, are disposed slide rods 12 and 12' for supporting against rotary motion the hub 11 of the idle wheel 10.

A screw 13, for moving the idle wheel backwards and forwards in an axial direction along the slide rods 12 and 12', is journaled at one of its ends in the stationary hub 72, and at its other end extends through the upwardly extending portion 73 of the support 71 for the accommodation of a hand wheel or crank 74. Disposed on the shaft of the screw 13, between the screw and the crank 74, is a pinion 75, which meshes with a spur wheel 76 carried upon suitable bearings 77 extending vertically from the support extension 73.

As the crank 74 is turned, the idle wheel 10 is caused to move along the slide rods 12 and 12', thus to vary the effective diameter of the disc 70, to which the motion of the strip is imparted through the interposed wheel 10. One of the spur wheel bearing extensions 77 may be equipped with a pointer 78 providing a point of fixed reference in relation to a scale 79 disposed for movement with the spur wheel 76. By reference to such scale, the amount of reduction or elongation being imparted to the strip may be determined, as in the case of the previously described embodiments.

The stationary hub member 72 of the disc mounting may be provided with an extension 80, at the end of which is journaled, for free rotational movement, a contactor roll 81; in this case, preferably tapered for engagement with the disc 70 so that all points on its periphery will travel at the same or relative speed as those portions on the disc which it engages.

The path described by the roller 81 on the disc 70, as the latter turns therebeneath, constitutes a commutator comprised of conductive portions 4 and insulative portions 5, similar to those previously described in the foregoing figures. The electric current to the disc is carried from the lead 29 through the support 71, and is returned through the conductive portions 4 of the commutator ring on the disc through the roller contact 81, where it is conducted through the extension 80, hub 72, and supports 71, to the lead 32. It will be understood that suitable insulation is provided for the return circuit, last described, so as to prevent a short circuit between the lead 29 on the support 71, and the lead 32. It will be, of course, understood that the commutator device, thus described, will be used in conjunction with a commutator at the entry side of the mill, similar to that shown and described in Figures 1, 2, 9 and 12.

In order to insure that the strip S bears firmly against the idle wheel 10, a weighted roller 82 is pivotally secured to the support extension 73, as at 83, in order that it may be raised out of the way when the measuring device is not in use, and lowered into position to press the strip against the idle wheel 10, irrespective of its position along the slide rods 12 and 12'. Suitable idle rollers 84 may be provided in the support 71 so as to lend subjacent support to the disc 70, thus to prevent the weight of the strip S, and weighted roller 82, from biasing it from its horizontal position.

In the embodiment last described, since the principal operating elements are disposed beneath and to one side of the pass line of the mill, it is not considered necessary to provide for the bodily movement of the mechanism, or any of its elements other than the weighted roller 82, to a more convenient position when not in use. However, in the cone-drum type, shown in Figure 4, it is preferable that those parts of the device overlying the strip be swingable relative to the strip to a position out of contact therewith. For this purpose the entire top portion of the machine can be lifted and rocked backwardly on bearings 85, in which position it can be secured by a latch 86 cooperating with a stationary pin 87. If desired, the entire device may then be turned in the horizontal upon a vertical axis of revolution 88 of its standard 89 so as to move the entire assembly away from the pass line of the strip to facilitate threading-up operations, etc. By the same token, it is contemplated that the commutator pinch roll assemblies, described hereinbefore, which are placed for engagement with the strip at the entering side of the mill, can be so mounted as to be removable from the pass line of the strip when their use is not required.

While I have shown and described one specific embodiment of my invention, it will be understood that I do not wish to be limited exactly thereto, since various modifications may be made without departing from the scope of my invention, as defined in the following claim.

I claim:

An extensometer comprising, in combination, a reducing instrumentality for metal stock, including means for advancing stock therethrough; a rotor driven by the movement of the stock approaching the reducing zone of the instrumentality; another rotor driven by the movement of the stock leaving said zone; a speed-change transmission for controlling one of said rotors; means for adjusting the speed-change transmission infinitely to vary the reactive ratio between said rotors; a mill-control pilot system including an electrical bridge comprising two circuits with a leg in common; a pair of commutators disposed to make and break each of said bridge circuits respectively; said commutators being each actuated by said rotors respectively; a mechanism responsive to unbalanced conditions of the bridge for automatically regulating the mill control to alter the reduction imparted to the stock by the reducing instrumentality, said mechanism being non-responsive and inoperative during conditions of substantial balance of the bridge to maintain an existing reducing condition; said mechanism being characterized by a toleration for minor departures from balance, on-gauge conditions, whereby the pilot system is ineffectual to disturb the mill control until a substantial departure occurs, then becoming instantly effective to institute correction.

PATRICK H. HUME.